United States Patent [19]

Nishimoto

[11] 4,337,519
[45] Jun. 29, 1982

[54] MULTIPLE/DIVIDE UNIT

[76] Inventor: Tetsunori Nishimoto, 395-26, Shimosakunobe, Takatsu-ku, Kawasaki-shi, Kanagawa 213, Japan

[21] Appl. No.: 115,619

[22] Filed: Jan. 28, 1980

[30] Foreign Application Priority Data

Feb. 1, 1979 [JP] Japan ................................ 54-009709

[51] Int. Cl.³ ............................ G06F 7/48; G06F 7/52
[52] U.S. Cl. .................................... 364/736; 364/760; 364/765
[58] Field of Search ................ 364/736, 760, 767, 765

[56] References Cited

U.S. PATENT DOCUMENTS

| | | | |
|---|---|---|---|
| 3,508,038 | 4/1970 | Goldschmidt et al. | 364/765 |
| 3,761,698 | 9/1973 | Stephenson | 364/736 |
| 3,828,175 | 8/1974 | Amdahl et al. | 364/765 |
| 4,041,292 | 8/1977 | Kindell | 364/760 |
| 4,215,419 | 7/1980 | Majerski | 364/760 |

OTHER PUBLICATIONS

Bratun et al., "Multiply/Divide Unit for a High-Performance Digital Computer", *IBM Tech. Disclosure Bulletin*, vol. 14, No. 6, Nov. 1971, pp. 1813–1816.

*Primary Examiner*—David H. Malzahn
*Attorney, Agent, or Firm*—Gerald J. Ferguson, Jr.; Joseph J. Baker

[57] ABSTRACT

An arithmetic unit which enables speedup of operation in a system for division and/or multiplication by setting specific logical conditions for a decoder. Such specific logical conditions allows elimination of adding means which are essential in known arithmetic units to constitute the division and multiplication system in combination with the decoder.

7 Claims, 9 Drawing Figures

MULTIPLE/DIVIDE UNIT

BACKGROUND OF THE INVENTION

1. Field of the Invention

This invention relates to an arithmetic unit of an electronic computer.

2. Description of the Prior Art

Heretofore, there has been known such a divider unit as disclosed in Japanese Patent Laid Open Specification No. 96647/74. If a divisor is D and a dividend is N, this unit can obtain an approximation $D_t^{-1}$ of a reciprocal of the divisor D by referring to a table stored in a read-only memory and perform an operation of $dt = 1 - D \times D_t^{-1}$. The unit further performs an operation of $N \times D_t^{-1}$ with respect to the dividend N. $N \times D_t^{-1}$ is grouped into an upper bit area Q (0) and a lower bit area R (0). This can be expressed by $$N \times D_t^{-1} = Q(0), R(0) \qquad (1)$$

Every operation cycle satisfies the following relationship:

$$R(i) + Q(i)dt = Q(i+1), R(i+1) \qquad (2)$$

where i is a number of operation cycles and Q (i+1) and R (i+1) are upper area bits and lower area bits in (i+1) th operation cycle respectively. According to the equation (2), Q (0), Q (1), ..., Q (i), ... can be obtained and they form a quotient.

In an operation of the equation (2), since Q (i+1) of the right side is upper bits of a sum of the left side, an output obtained after passing through a multiplier, e.g. a carry save adder device arranged in a tree structure, may be in separate two forms, such as a carry and a sum, to calculate the left side. However, after R (i) is added to Q (i)×dt according to the left side of the equation (2), the output must assume a single form by adding the carry and sum by an adding means. At this time, it is required to sequentially propagate carry signals in a direction from a lowermost bit order to an uppermost bit order. This prevents speedup of the operation. More specifically, according to the disclosure of Japanese Laid Open Specification No. 96647/74, when the equation (2) is repeated, a carry must be propagated to obtain Q (i+1) and R (i+1) through the adding means in every operation cycle.

To improve such a prior art, a carry look ahead adder may be employed as the adding means. In this case, the operation speed may be improved to some extent. However, since the carry look ahead adder has plural stages of gates therein, remarkable improvement in the operation speed cannot be expected.

The theory of Japanese Laid Open Specification No. 96674/74 will now be explained referring to FIG. 1. An arithmetic unit illustrated in the figure comprises a multiplier device 1 employing a carry save adder device of a tree structure, a carry save adder 2, an adder 3, a decoder 4 for decoding adjacent three bits inputted thereto, according to Table 1, and a selector 100A.

The operation of the unit is summarized as follows:

(1) $dt = 1 - D \times D_t^{-1}$ is first obtained and fed to the multiplier device 1 (carry save adder device) as a multiplicand.

(2) $N \times D_t^{-1}$ is obtained and fed to the selector 100A.

(3) The selector 100A divides $N \times D_t^{-1}$ into an upper bit area Q (0) and a lower bit area R (0) and Q (0) and R (0) are fed to the decoder 4 and the carry save adder 2, respectively.

(4) The decoder 4 receives an input of Q (0), decodes adjacent three bits according to Table 1 and transfers the decoded values to the carry save adder device 1 through a line 6.

(5) The carry save adder device 1 performs multiplication of an output of the decoder 4 and dt according to the tree formation of the device 1 and outputs a sum and a carry to the carry save adder 2 through a line 8 and a line 9 respectively.

(6) The carry save adder 2 receives the aforesaid three input data, i.e. sum through the line 8, carry through the line 9 and R (0), performs an operation of carry save addition and outputs, to the adder 3, a sum through a line 10 and a carry through a line 11.

(7) The adder 3 performs an operation of addition of the sum and the carry through the lines 10 and 11 respectively and outputs the result to the selector 100A through a line 12.

(8) The selector 100A receives the output of the result of the addition, divides the output into upper data Q (1) and lower data R (1) and outputs Q (1) to the decoder 4 and R (1) to the carry save adder 2.

(9) Q (2) and R (2) are obtained by carrying out the steps 4 to 8. Similarly, Q (3), R (3), Q (4), R (4) ... are obtained.

(10) The upper data Q (i) (where i=0, 1, 2, ...) obtained in each cycle is outputted to the outside so as to utilize it as a partial quotient.

As apparent from the foregoing description, the adder 3 is essential in the divider unit of the prior art. However, it is apparent that the employment of the adder 3 lengthens the operation time of the arithmetic unit as much as the operation time of the adder 3.

This problem involved in the prior art divider unit is also encountered in a known multiplier unit. A block diagram of the known multiplier unit is illustrated in FIG. 2. In the figure, the same numerals and letters designate the same contents as in FIG. 1. Inputs X and Y are subjected to operation of addition (X+Y) by an adder 5. A decoder 4 carries out decoding according to Table 1 and the result is inputted to a multiplier device 1 formed of a tree-structured carry save adder device. The multiplier device 1 performs an operation based on data Z inputted from the outside and the result obtained from the decoder 4 and it outputs to the outside the result of (X+Y)×Z. This unit requires an operation of addition of X and Y through all bits thereof to perform addition of (X+Y). The time required to perform addition of (X+Y) accounts to considerable length so that substantial improvement cannot be expected as far as the addition operation of (X+Y) has been essential.

OBJECT OF THE INVENTION

It is therefore an object of the present invention to provide an arithmetic unit which performs multiplication or division by specifying a logical content of a decoder.

SUMMARY OF THE INVENTION

In accordance with the present invention, there is provided an arithmetic unit for carrying out an operation of (X+Y)×Z based on two data X and Y and data Z, which comprises:

a decoder for directly providing decoding conditions each for respective corresponding bits of the data X and Y without carrying out adding operation (X+Y) of the data X and Y, carrying out the decoding according to said decoding conditions and outputting selecting signals for given rates relative to the data Z; and a device for obtaining values corresponding to products of the data Z and said given rates selected by said respective signals and carrying out adding operation of said values.

DESCRIPTION OF THE PREFERRED EMBODIMENT

Figure 1:
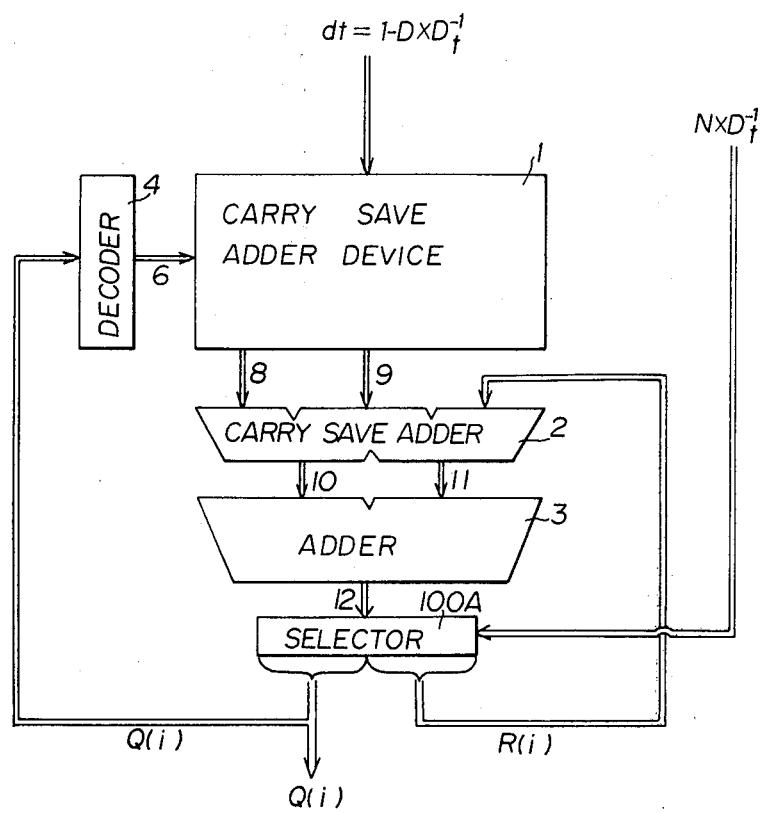
FIGS. 1 and 2 show arithmetic units of prior art.
Figure 2:
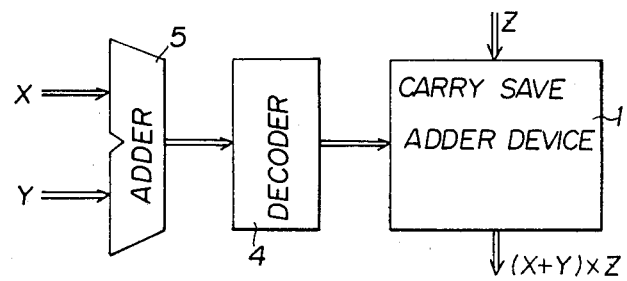

The operation theory of a divider unit according to the present invention will now be explained. A dividend D, an approximation $D_t^{-1}$ of a reciprocal of the dividend D, $dt = 1 - D \times D_t^{-1}$ and $N \times D_t^{-1}$ are similar to those in the prior art. Now, $\overline{Q}(0)$ is supposed to be an upper bit area of $N \times D_t^{-1}$ and $\overline{R}(0)$ a lower bit area thereof. This can be expressed by $$N \times D_t^{-1} = \overline{Q}(0) + \overline{R}(0) \qquad (3)$$

When this relationship is applied to an operation cycle i, there can be obtained the following expression $$\overline{R}(i) + \overline{Q}(i) \times dt = \overline{Q}(i+1) + \overline{R}(i+1) \qquad (4)$$

In this connection, it is to be noted that Q (0), R (0), Q (i), R (i), Q (i+1) and R (i+1) do not always constitute the same relations as Q (0), R (0), etc. do in Japanese Laid Open Specification No. 96647/74. Q and R do not designate negative logic.

When i in the equations (3) and (4) are substituted by 0, ... l−1 and the left sides thereof and the right sides thereof are added respectively and set equal each other, there can be obtained $$N \times D_t^{-1} + \overline{R}(0) + \overline{Q}(0) \times dt + \overline{R}(1) + \overline{Q}(1) \times dt + \ldots + \overline{R}(l-1) + \overline{Q}(l-1) \times dt = \overline{Q}(0) + \overline{R}(0) + \overline{Q}(1) + \overline{R}(1) + \ldots + \overline{Q}(l) + \overline{R}(l) \qquad (5)$$

When $dt = 1 - D_t^{-1}$ is substituted into the equation (5), there can be obtained $$N \times D_t^{-1} - [\overline{Q}(0) + \overline{Q}(1) + \ldots + \overline{Q}(l-1)] \times D \times D_t^{-1} = \overline{Q}(l) + \overline{R}(l) \qquad (6)$$

If the both sides are divided by $D_t^{-1}$, there can be obtained $$N - [\overline{Q}(0) + \overline{Q}(1) + \ldots + \overline{Q}(l-1)] \times D = Q[(l) + \overline{R}(l)]/D_t^{-1} \qquad (7)$$

If $\overline{Q} = \overline{Q}(0) + \overline{Q}(1) + \ldots \overline{Q}(l-1)$, there can be obtained $$N = \overline{Q} \times D + [\overline{Q}(l) + \overline{R}(l)]/D_t^{-1} \qquad (8)$$

As can be seen from the foregoing development, the equation (8) can be obtained without utilizing that $D_t^{-1}$ is an approximation of a reciprocal of D. Therefore, the equation (8) can be constituted even though $D_t^{-1}$ is not an approximation of a reciprocal of D.

If $\overline{Q}(l) + \overline{R}(l)$ is sufficiently small, $\overline{Q}$ is a quotient resulting from the division of N by D and $[\overline{Q}(l) + \overline{R}(l)]/D_t^{-1}$ is a remainder.

Therefore, if $\overline{Q}(i+1)$ and $\overline{R}(i+1)$ are determined so as to converge the right side of the equation (4) to zero by refreshing the operation cycles, $\overline{Q}$ will be a quotient.

In this case, an approximation $D_t^{-1}$ of a reciprocal of D is so selected as to satisfy $|dt| < 2^{-h-1}$ where h is a positive integer.

If absolute values of the left and the right side of the equation (3) are each smaller than a constant K and the constant K satisfies the following relation $$|\overline{Q}(0)| < K \text{ and } |\overline{R}(0)| < K \times 2^{-h-1} \qquad (9),$$

the absolute value of the right side of the equation (4) substituted by i=0 is $$|\overline{Q}(1) + \overline{R}(1)| (= |\overline{R}(0) + \overline{Q}(0) \times dt|) = |\overline{R}(0)| + |\overline{Q}(0)| \times dt > K \times 2^{-h-1} + K \times 2^{-h-1} (= K \times 2^{-h}) \qquad (10)$$

Similarly, if $\overline{Q}(i)$ and $\overline{R}(i)$ are selected so as to satisfy $$|\overline{Q}(i)| < K \times 2^{-hxi} \text{ and } |\overline{R}(i)| < K \times 2^{-hxi} \times 2^{-h-1} \qquad (11),$$

there can be obtained $$|\overline{Q}(i+1) + \overline{R}(i+1)| < K \times 2^{-hx(i+1)} \qquad (12)$$

and the right and the left side of the equation (4) approaches zero.

One example of determination of $\overline{Q}$ and $\overline{R}$ satisfying the aforesaid equations will be described below. To operate the equation (4), addition of the left side is carried out by a carry save adder which performs an operation with a sum and a carry separate. In each operation cycle, the carry is not propagated. The carry and the sum, i.e. outputs of the carry save adder are each grouped into a lower bit area containing h+3 or lower bits counted from the top and an upper bit area containing h+2 or upper bits. When a sum of the carry and sum of the lower bit area lower than the h+2 bit is supposed to be $\overline{R}(i)$ and a sum of the carry and sum of the upper bit area of the h+2 or upper bits is supposed to be $\overline{Q}(i)$, there can be obtained the equation (12).

If the operation is carried out in such a manner that the carry and sum of the h+2 or upper bits are processed by an adder to obtain $\overline{Q}(i)$, and $\overline{Q}(i)$ is decoded into +1, −1, +2, −2 or 0 according to Table 1, and then dt is added by the carry save adder to attain multiplication of $\overline{Q}(i) \times dt$, it takes a superfluous time corresponding to an operation time of the adder. In the present invention, the carry and sum of the upper bit are formed of the h+2 or upper bits are denoted by $S_1, S_2, \ldots S_h, S_{h+1}, S_{h+1}$ (13)

$C_1, C_2, \ldots C_h, C_{h+1}, C_{h+2}$ $$\overline{Q}(i) = \sum_{j=1}^{h+2} S_j \times 2^{-h} + \sum_{j=1}^{h+2} C_j \times 2^{-j}$$

$$= \sum_{j=1}^{\frac{h}{2}+1} [S_{2j-1} \times 2^{-(2j-1)} + S_{2j} \times 2^{-2j}]$$

$$= \sum_{j=1}^{\frac{h}{2}+1} [C_{2j-1} \times 2^{-(2j-1)} + C_{2j-1} \times 2^{-2j}]$$

$$= \sum_{j=1}^{\frac{h}{2}+1} [S_{2j-1} \times 2 + S_{2j} + C_{2j-1} \times 2 + C_{2j}] \times 2^{-2j}$$

If it is supposed that $S_{2j-1} \times 2 + S_{2j} + C_{2j-1} \times 2 + C_{2j} =$ (14)

$$a_{2j} \times 2^2 + b_{2j} \times 2 + d_{2j} \left( \text{where } j = 1 \ldots, \frac{h}{2} + 1 \right),$$

$$\overline{Q}(i) = \sum_{j=1}^{\frac{h}{2}+1} [a_{2j} \times 2^2 + b_{2j} \times 2 + d_{2j}] \times 2^{-2j}$$ (15)

$$= \sum_{j=0}^{\frac{h}{2}+1} [b_{2j} \times 2 + d_{2j} + a_{2j+2}] \times 2^{-2j}$$

where $b_0$, $d_0$ and $a_{h+3}$ are zero. Therefore, $d_{2j} + a_{2j+2} = (d_{2j} V a_{2j+2}) \times 2 - (d_{2j} \oplus a_{2j} - 2)$ (16)

where V and $\oplus$ denote OR and exclusive OR, respectively.

Substituting the equation (16) into the equation (15), $$\overline{Q}(i) = \sum_{j=0}^{\frac{h}{2}+1} [b_{2j} \times 2 + (d_{2j} V a_{2j+2}) \times$$ (17)

$$2 - (d_{2j} \oplus a_{2j+2})] \times 2^{-2j}$$

$$= \sum_{j=0}^{\frac{h}{2}+1} [- (d_{2j-2} \oplus a_{2j}) \times 4 + b_{2j} \times$$

$$2 + (d_{2j} V a_{2j+2}) \times 2] \times 2^{-2j}$$

$$= \sum_{j=0}^{\frac{h}{2}+1} [- (d_{2j-2} \oplus a_{2j}) \times$$

$$2 + b_{2j} + (d_{2j} V a_{2j+2})] \times 2^{-2j+1}$$

where $d_{-2} = 0$.

Since $(d_{2j-2} \oplus a_{2j})$, $b_{2j}$ and $d_{2j} V a_{2j}$ are each 0 or 1, $-(d_{2j-2} \oplus a_{2j}) \times 2 + b_{2j} + (d_{2j} V a_{2j+2})$ in the equation (17) is any one of $-2, 01, 0, 1$ and 2. This is summarized in Table 2.

Figure 3:
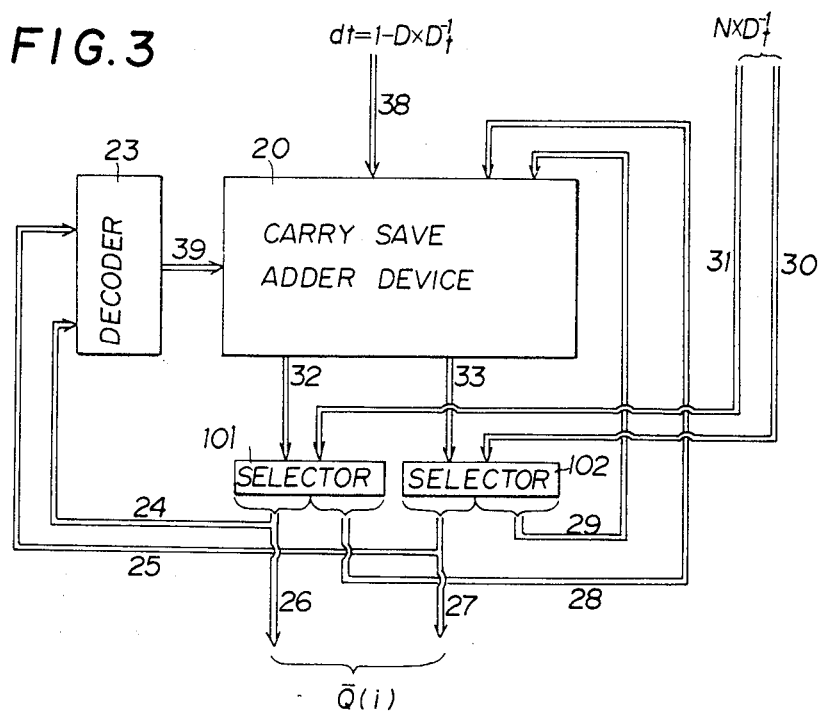
FIG. 3 is a diagram showing one form of an arithmetic unit embodying the present invention.

FIG. 3 illustrates a preferred form of a divider unit embodying the present invention as mentioned above. The divider unit comprises a carry save adder device 20 of a tree structure having a multiplication function, a decoder 23 and selectors 101A and 102A. The device 20 produces a carry output 32 and a sum output 33 separate from each other. A line 38 is a line for supplying $dt = 1 - D \times D_t^{-1}$ to the device 20 as a multiplicand. Lines 28 and 29 are input lines to the device 20 for supplying thereto a data to be added to the result of a multiplication. Line 39 is a line for supplying to the device 20 the result of decoding of a multiplier into +2, +1, 0, -1 or -2 according to Table 2.

The operation of the divider unit according to the present invention will now be described.

(1) $dt = 1 - D \times D_t^{-1}$ is first obtained and supplied to the device 20 as a multiplicand.

(2) $N \times D_t^{-1}$ is obtained and supplied to the selectors 101A and 102A.

(3) The selectors 101A and 102A divide $N \times D_t^{-1}$ into an upper bit area Q (0) and a lower bit area R (0) so as to output $\overline{Q}$ (0) to the decoder 23 and $\overline{R}$ (0) to the device 20.

(4) The decoder 23 decodes an input $\overline{Q}$ (0) according to Table 2 and the decoded value 39 is outputted to the device 20. The value 39 is formed of a plurality of decoded signals which are outputted, in parallel, to the device 20. The decoded signals each determine respective values $\beta$ (rate) to multiply the data dt fed through the line 38.

(5) A selector 100 of the device 20 receives the plural outputs from the decoder 23 and the data dt from the line 38. The selector 100 outputs data $dt \times \beta$ by an output signal corresponding to one of four values $\beta$ (2, -2, 1 and -1) obtained for the respective output signals from the decoder 23. It is apparent from Table 2 that $\beta$ may be zero. The conditions of $\beta = 0$ will be mentioned below. Explanation will be made referring to any adjacent two bit areas illustrated in FIG. 5. The two bit areas output $\beta_i$ and $\beta_{i+1}$ selected from the four values (2, 02, 1, -1) according to Table 2. It is now supposed that the lower bit area outputs $\beta_i$ and the upper bit area outputs $\beta_{i+1}$. Then, the operation of $dt \times \beta$ is carried out in the form of $dt \times \beta_i$ for the lower bit area and $dt \times \beta_{i+1} \times 2^2$ for the upper bit areas. These relations can be applied to any bit area illustrated in FIG. 5. In other words, if the decoded outputs of bit areas from the lowermost one to uppermost one are $\beta_1, \beta_2, \beta_3 \ldots \beta_l$, the selector 100 outputs $dt \times \beta_1, dt \times \beta_2 \times 2^2, dt \times \beta_3 \times 2^4, \ldots dt \times \beta_l \times 2^{2l-2}$. When $\beta = 0$, $dt \times 0 = 0$ and the output becomes zero. In this connection, it is to be noted that the aforesaid outputs are produced without carrying out multiplication. More specifically, 2 of the values $\beta$ may be obtained by -1 bit shift, -2 may be obtained by inversion of the conditions for the value 2, 1 may be obtained under the conditions as they are and -1 may be obtained by inversion of the conditions for the value 1. Furthermore, $2^{2i-2}$ (where $i = 1, 2, 3, \ldots$) may also be attained by shifting. While the outputs may be thus obtained by shifting, in view of the fact that the outputs may be expressed in the form of 2 and its exponent with respect to dt, the form of 2 and its exponent is obtained in the present invention by connecting the lines to positions shifted by given bits. This allows a high-speed data selection. The plural outputs from the selector 100 and R (0) obtained through the lines 28 and 29 are treated by the carry save adders formed in a tree structure and a sum and a carry are outputted through the lines 32 and 33, respectively.

(6) The selectors 101A and 102A divide the carry and the sum into upper bit areas $C_h(1)$ and $S_h(1)$, and lower bit areas $C_l(1)$ and $S_l(1)$, respectively, and they output $C_h(1)$ and $S_h(1)$ to the decoder 23 and $C_l(1)$ and $S_l(1)$ to the carry save adder device 20, respectively.

(7) $S_h(2)$, $C_h(2)$, $S_l(2)$ and $C_l(2)$ are then obtained by carrying out the steps (4) to (6). Similarly, $S_h(3)$, $C_h(3)$, $S_l(3)$ and $C_l(3)$ ... are determined.

(8) The upper data $S_h(i)$ and $C_h(i)$ (where $i = 0, 1, 2, ...$) obtained in the respective cycles are taken out so as to utilize as partial quotients.

Figure 4:
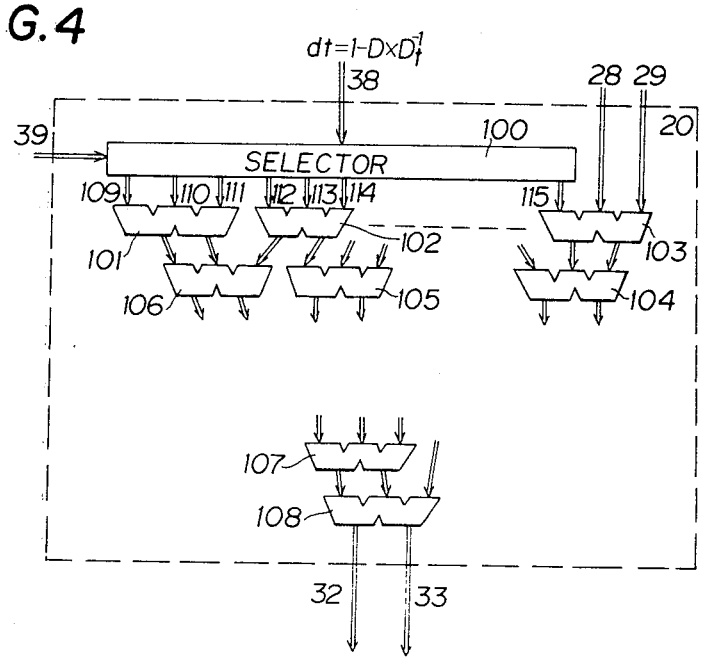
FIG. 4 shows a detail of part of the arithmetic unit illustrated in FIG. 3 and in particular the carry save adder device 20.

The carry save adder device 20 is illustrated in detail in FIG. 4. Numerals 101 to 108 designate the carry save adders. The selector 100 is a circuit which, as inputs, data through the line 38 and data through the line 39 (i.e. +2, +1, 0, −1 or −2), performs an operation according to Table 2 and outputs the results through lines 109 to 115.

Each of the outputs through the lines 32 and 33 are grouped into the upper bit area formed of 1 to $h+2$ bits and the lower bit area formed of $h+3$ or lower bits and divided into lines 24 and 25 and lines 28 and 29, respectively. The sum of the contents of the line 24 and 25 forms $\overline{Q}(i)$, while the sum of the contents of the lines 28 and 29 forms $\overline{R}(i)$. The lines 24 and 25 are coupled to inputs of the decoder 23. The decoder 23 produces an output through the line 39.

Figure 5:
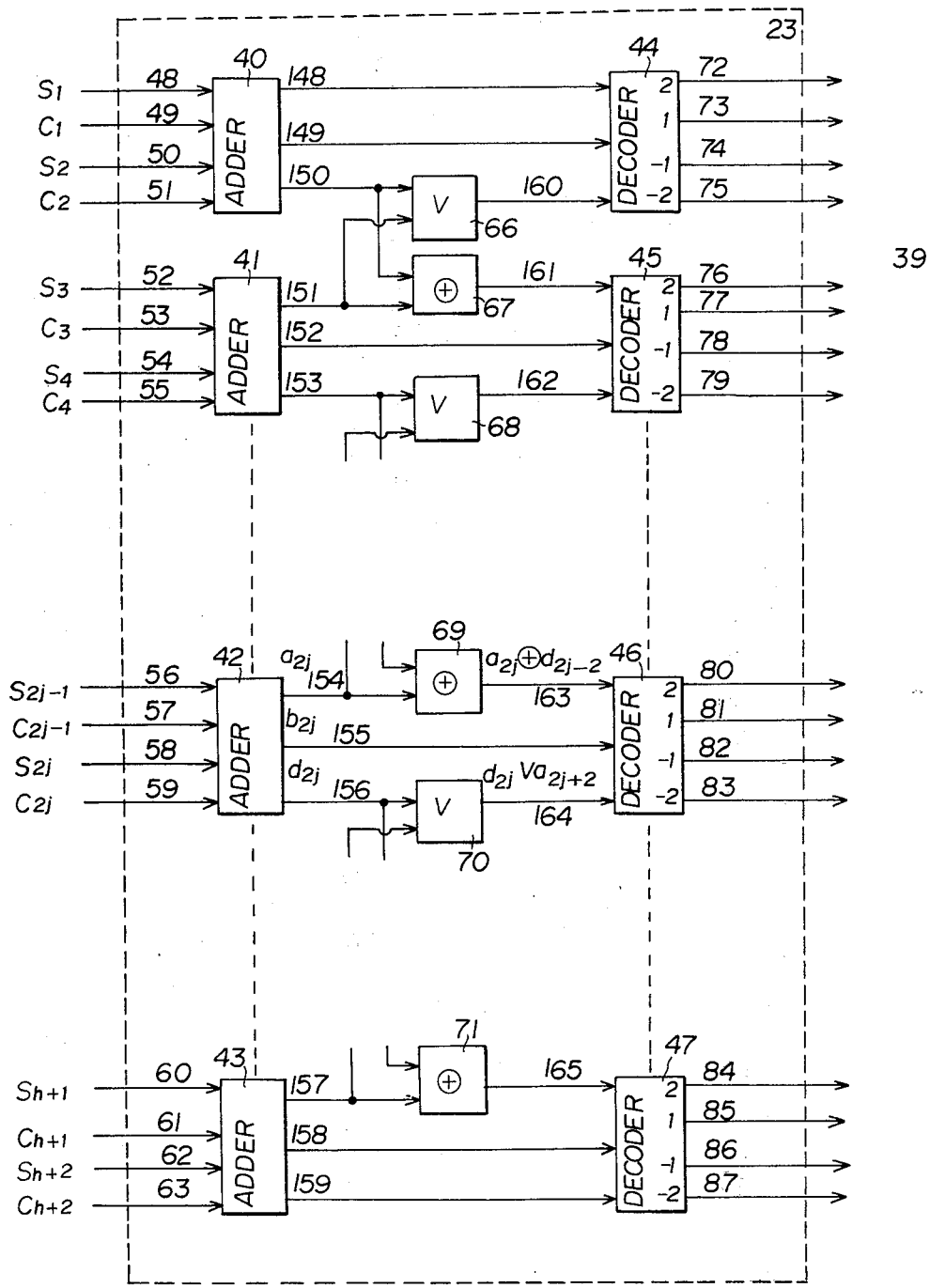
FIG. 5 shows a detail of another part of the arithmetic unit illustrated in FIG. 3 and in particular the decoder 23.

The decoder 23 illustrated in FIG. 5. Lines 48, 50, 52, 52 ... 60 and 62 correspond to the line 24 and lines 49, 51 53, 55 ... 61 and 63 correspond to the line 25. 40 to 43 each designate a two-bit full adder having a function for carrying out the equation (14). 66, 68 and 70 are OR gates and 67, 69 and 71 are exclusive OR gates. Decoders 44 to 47 each have a function to carry out decoding according to Table 2.

The two-bit full adder 42 will now be explained more specifically. The adder 42 receives, as inputs, $S_{2j-1}$, $S_{2j}$, $C_{2j-1}$ and $C_{2j}$ and produces outputs $a_{2j}$, $b_{2j}$ and $d_{2j}$ to lines 154, 155 and 156, respectively. The exclusive OR gate 59 receives inputs $a_{2j}$ and $d_{2j-2}$ and produces an output $a_{2j} \oplus d_{2j-2}$ to the line 63. The OR gate 70 receives $d_{2j}$ on the line 56 and $a_{2j+2}$ as inputs and produces an output $d_{2j} \vee a_{2j+2}$ to the line 64. The decoder 46 is a circuit which outputs "1" to output lines 80, 81, 82 or 83 when the result of decoding based on $a_{2j} \oplus d_{2j-2}$, $d_{2j} \vee a_{2j+2}$ and $b_{2j}$ appearing at the lines 163, 164 and 155 respectively is 2, 1, −1 or −2. Lines 72 to 87 are collectively expressed by 39 in FIGS. 3 and 4.

In FIG. 3, the data $N \times D_t^{-1}$ is divided into two, which are inputted to the selectors 101A and 102A through the lines 31 and 30, respectively, to carry out the equation (3).

As mentioned above, $\overline{R}(i)$ is the sum of the contents of the lines 29 and 28. In case the equation (4) is implemented as it is, $\overline{Q}(i)$ and $\overline{R}(i)$ become smaller by $2^{-h}$ every implementation. To obviate an inconvenience caused thereby, $\overline{Q}(i)$ and $\overline{R}(i)$ are multiplied by $2^h$ after every implementation of the equation (4). To this end, the contents of the lines 28 and 29 may be shifted to the left by h bits. However, the shifting operation requires a shifting time. Therefore, to cut such a shifting time and speed up the operation, output lines of respective bits of $\overline{Q}(i)$ and $\overline{R}(i)$ may be adapted to be connected to bits deflected to the left by h bits.

Figure 6:
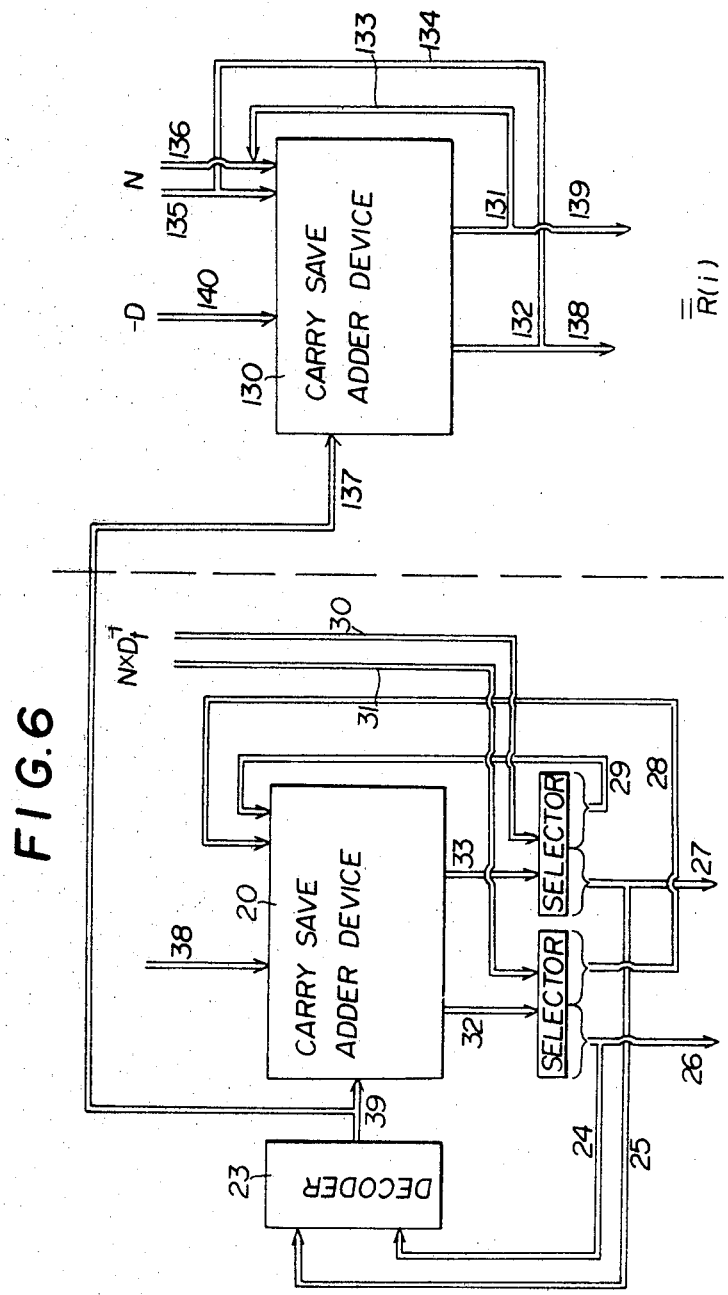
FIG. 6 is a diagram showing another form of arithmetic unit embodying the present invention.

As also mentioned above, the sum of the contents of the lines 26 and 27 provides $\overline{Q}(i)$. $Q(i)$ constitutes a quotient. At this time, two bits in the $h+2$ bits overlap. Therefore, a quotient is obtained for h bits in one cycle. A remainder may be obtained by the sum of the contents of the lines 32 and 33 divided by $D_t^{-1}$ as can be seen from the equation (8). However, since this is difficult to carry out, $$N = \overline{\overline{R}}(0) \tag{18}$$

$$R(i+1) = \overline{\overline{R}}(i) - \overline{Q}(i) \times D \tag{19}$$

may be carried out after every implementation of the equations (3) and (4) to obtain a remainder in the form of $\overline{\overline{R}}(i+1)$. A system for realizing this theory is illustrated in FIG. 6. The leftward portion of FIG. 6 is similar to the unit illustrated in FIG. 3. A carry save adder device 130 has the same formation as the carry save adder device 20. 140 designates a line for receiving a multiplicand. Lines 132 and 131 correspond to the output lines 32 and 33 of the carry save adder device 20, respectively. An input $-D$ is fed through the line 140 and an input N is first fed through lines 135 and 136. Thereafter, the outputs on the lines 131 and 132 are inputted to the device 130 through lines 133 and 134 respectively. $R(i)$ is the sum of the contents of lines 138 and 139. In FIG. 6, a carry save adder device for carrying out the equations (18) and (19) are provided separately from the device 20. However, the carry save adder device 20 may be employed to alternatingly compute $\overline{Q}(i) + \overline{R}(i)$ and $\overline{\overline{R}}(i)$ according to a pipe-line method to obtain a remainder. As the value h becomes larger, the number of repetition can be reduced. However, the value h is limited by a capacity of a read-only memory when $D_t^{-1}$ is outputted by the read-only memory. In this case, h is preferred to be 10 or so.

In this connection, it is to be noted that the number of stages of gates the decoder 23 has is not varied irrespective of the magnitude of h. In the figure, 40, 66 and 44 constitute a first stage and 41, 67, 68 and 45 a second stage. If the contents of the lines 24 and 25 are added by the adding means as mentioned in relation with the prior art, it takes longer time to pass through the circuit as h increases. The present invention is free from such a problem.

In accordance with the present invention, a quotient for h bits are obtained by one cycle and carries are not propagated between cycles, so that division can be carried out at a high speed.

Although the bits are divided into the upper bit area and the lower bit area by $h+2$ bits in the foregoing embodiment, there may be divided by $h+3$ bits, $h+4$ bits .... However, in these cases, since lowr three bits of $h+3$ bits, lower four bits of $h+4$ bits overlap, a superfluous operation is necessitated.

Then, there will be explained a multiplier unit for carrying out an operation of $(X+Y) \times Z$ in accordance with the present invention. The theory of the multiplier unit is as follows:

The contents of the respective bits are written as
$X_1, X_2, \ldots, X_h, X_{h+1}, X_{h+2}$
$Y_1, Y_2, \ldots, Y_h, Y_{h+1}, Y_{h+2}$
Supposing that $$\overline{Q}(i) = \sum_{j=1}^{h+2} X_j \times 2^{-j} + \sum_{j=1}^{h+2} Y_j \times 2^{-j} \tag{20}$$

-continued $$= \sum_{j=1}^{\frac{h}{2}+1} [X_{2j-1} \times 2^{-(2j-1)} + Y_{2j} \times 2^{-2j}]$$

$$+ \sum_{j=1}^{\frac{h}{2}+1} [X_{2j-1} \times 2^{-(2j-1)} + Y_{2j-1} \times 2^{-2j}]$$

$$= \sum_{j=1}^{\frac{h}{2}+1} [X_{2j-1} \times 2 + X_{2j} + Y_{2j-1} \times 2 + Y_{2j}] \times 2^{-2j}$$

$$X_{2j-1} \times 2 + X_{2j} + Y_{2j-1} \times 2 + Y_{2j}$$

$$= a_{2j} \times 2^2 + b_{2j} \times 2 + d_{2j} \left( j = 1 \ldots, \frac{h}{2} + 1 \right)$$

then $$\overline{Q}(i) = \sum_{j=1}^{\frac{h}{2}+1} [a_{2j} \times 2^2 + b_{2j} \times 2 + d_{2j}] \times 2^{-2j} \quad (21)$$

$$= \sum_{j=1}^{\frac{h}{2}+1} [b_{2j} \times 2 + d_{2j} + a_{2j} + 2] \times 2^{-2j}$$

where $b_0$, $d_0$ and $a_{h+3}$ are 0. There can be obtained $$d_{2j} + a_{2j+2} = (d_{2j} V a_{2j+2}) \times 2 - (d_{2j} \oplus a_{2j+2}) \quad (22)$$

where V and $\oplus$ represent OR and exclusive OR respectively.

If the equation (22) is substituted into the equation (21), $$\overline{Q}(i) = \sum_{j=0}^{\frac{h}{2}+1} [b_{2j} \times 2 + (d_{2j} V a_{2j+2}) \times \quad (23)$$

$$2 - (d_{2j} \oplus a_{2j+2})] \times 2^{-2j}$$

$$= \sum_{j=0}^{\frac{h}{2}+1} [-(d_{2j-2} \oplus a_{2j}) \times 4 + b_{2j} \times 2 +$$

$$(d_{2j} V a_{2j+2}) \times 2] \times 2^{-2j}$$

$$= \sum_{j=0}^{\frac{h}{2}+1} [-(d_{2j-2} \oplus a_{2j}) \times 2 +$$

$$b_{2j} + (d_{2j} V a_{2j+2})] \times 2^{-2j+1}$$

where $d_{-2}=0$. Since each of $(d_{2j-2} \oplus a_{2j})$, $b_{2j}$ and $d_{2j} V a_{2j+2}$ is 0 or 1, $-(d_{2j-2} \oplus a_{2j}) \times 2 + b_{2j} + (d_{2j} V a_{2j+2})$ in the equation (16) is any one of $-2, -1, 0, 1$ and 2. These can also be summarized in Table 2.

Figure 7:
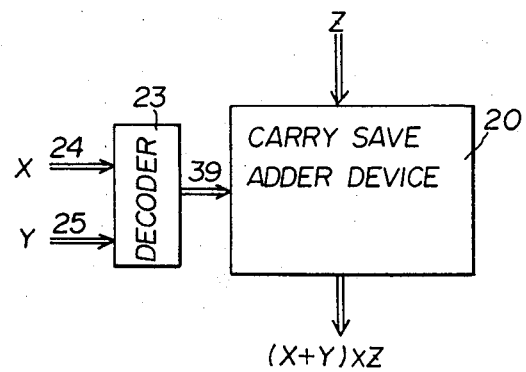
FIG. 7 is a diagram showing a still another form of arithmetic unit embodying the present invention.

A preferred form of an arithmetic unit for carrying out an operation of $(X+Y) \times Z$ in accordance with the aforesaid theory is illustrated in FIG. 7. This arithmetic unit comprises a tree-structured carry save adder device 20 and a decoder 23. The device 20 is a multiplier device having carry save adders arranged in a tree structure and produces separate outputs to lines 32 and 33 in the forms of a carry and a sum. The output may be in the form of combination of the sum and the carry. 38 designates a line through which Z is inputted to the device 20. 39 is a line to the device 20 for inputting a result of decoding of a multiplifier into $+2, +1, 0, -1$ or $-2$.

Figure 8:
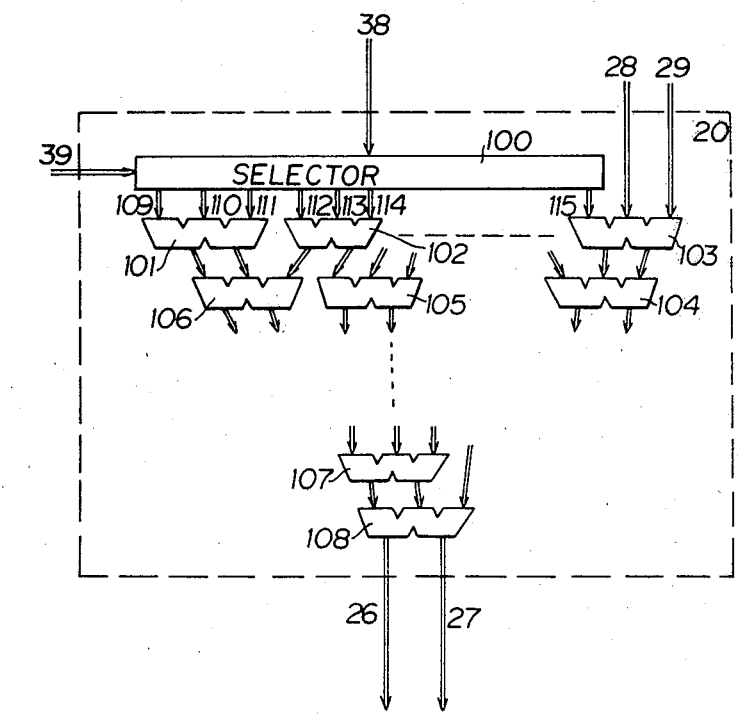
FIG. 8 shows a detail of part of the arithmetic unit illustrated in FIG. 7 and in particular the carry save adder device 20.

The carry save adder device 20 is illustrated in detail in FIG. 8. Numerals 101 to 108 designate the carry save adders. The selector 100 is a circuit which receives, as inputs, data through the line 38 and data through the line 39 (i.e. $+2, +1, 0, -1$ or $-2$), performs an operation according to Table 2 and outputs the results through lines 109 to 175.

The lines 24 and 25 receive inputs of X and Y. Numeral 23 designates a decoder for producing an output through the line 39.

Figure 9:
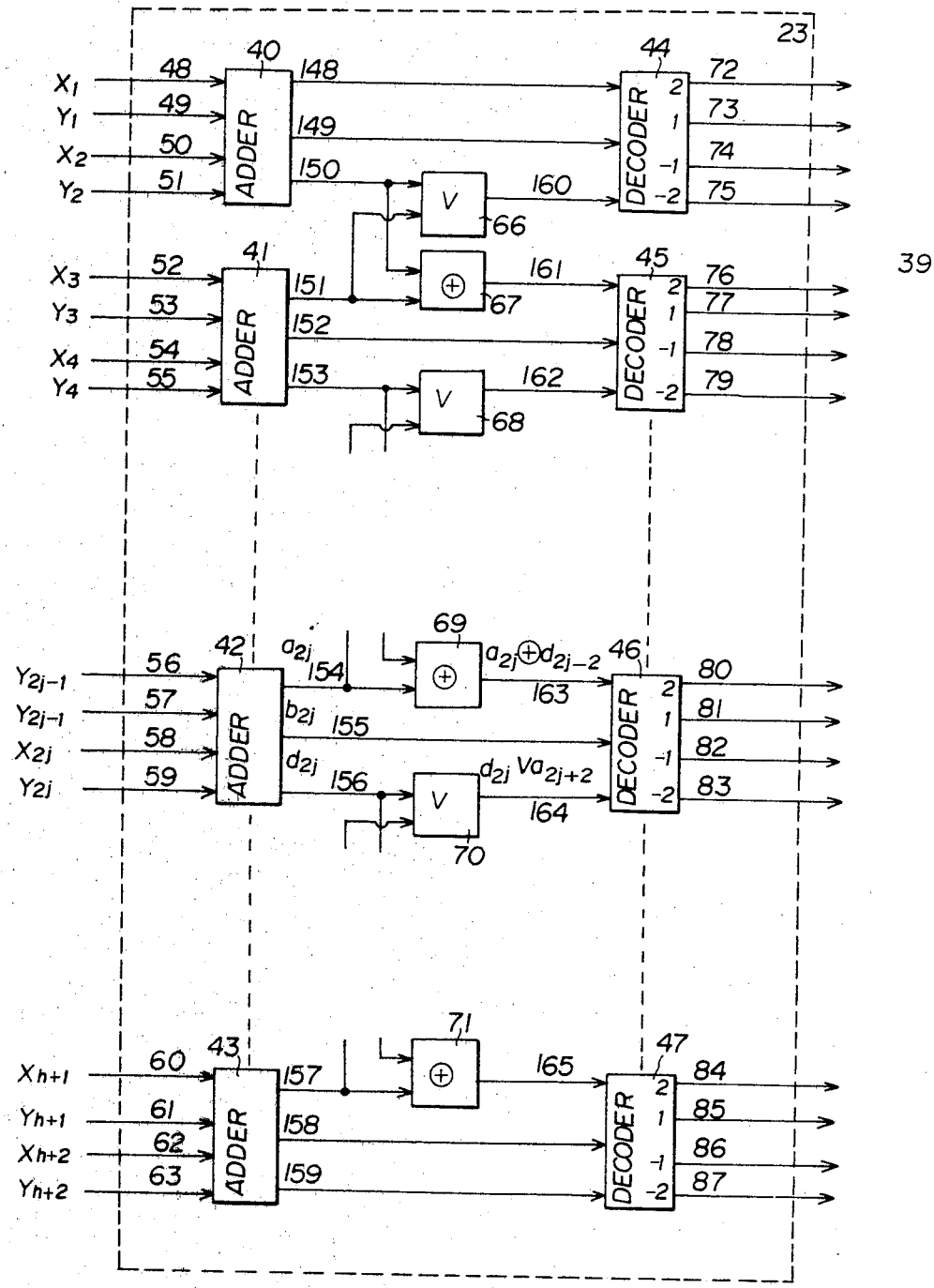
FIG. 9 shows a detail of another part of the arithmetic unit illustrated in FIG. 7 and in particular the decoder 23.

The decoder 23 is illustrated in FIG. 9. Lines 48, 50, 52, 54 ... 60 and 62 correspond to the line 24 and lines 49, 51, 53, 55 ... 61 and 63 correspond to the line 25. 40 to 43 each designate a two-bit full adder having a function for carrying out the equation (14). 66, 68 and 70 are OR gates and 67, 69 and 71 are exclusive OR gates. Decoders 44 to 47 each have a function to carry out decoding according to Table 2.

The two-bit full adder 42 will now be explained more specifically. The adder 42 receives, as inputs, $S_{2j-1}$, $S_{2j-1}$, $S_{2j}$, $C_{2j-1}$ and $C_{2j}$ and produces outputs $a_{2j}$, $b_{2j}$ and $d_{2j}$ to lines 154, 155 and 156, respectively. The exclusive OR gate 69 receives inputs $a_{2j}$ and $d_{2j-2}$ and produces an output $a_{2j} \oplus d_{2j-2}$ to the line 63. The OR gate 70 receives $d_{2j}$ on the line 56 and $a_{2j+2}$ as inputs and produces an output $d_{2j} V a_{2j+2}$ to the line 64. The decoder 46 is a circuit which outputs "1" to output lines 80, 81, 82 or 83 when the result of decoding based on $a_{2j} \oplus d_{2j-2}$, $d_{2j} V a_{2j+2}$ and $b_{2j}$ appearing at the lines 163, 164 and 155 respectively is 2, 1, $-1$ or $-2$. Lines 72 to 87 are collectively expressed by 39 in FIGS. 7 and 8.

As can be seen from FIG. 9, the number of stages of gates the decoder 23 has is not varied irrespective of the magnitude of h. In the figure, 40, 66 and 44 constitute a first stage and 41, 67, 68 and 45 a second stage. If the contents of the lines 24 and 25 are added by the adding means as mentioned in relation with the prior art, it takes longer time to pass through the circuit as h increases. The present invention is free from such a problem.

TABLE 1

| Value of respective bits of multiplier | | | Values to be added to a |
|---|---|---|---|
| i | i + 1 | i + 2 | carry save adder device |
| 0 | 0 | 0 | 0 |
| 0 | 0 | 1 | 1 × (multiplicand) |
| 0 | 1 | 0 | 1 × (multiplicand) |
| 0 | 1 | 1 | 2 × (multiplicand) |
| 1 | 0 | 0 | −2 × (multiplicand) |
| 1 | 0 | 1 | −1 × (multiplicand) |
| 1 | 1 | 0 | −1 × (multiplicand) |
| 1 | 1 | 1 | 0 |

TABLE 2

| $d_{2j-2} \oplus a_{2j}$ | $b_{2j}$ | $d_{2j} V a_{2j+2}$ | $(d_{2j-2} \oplus a_{2j}) \times 2 + b_{2j} + (d_{2j} V a_{2j+2})$ |
|---|---|---|---|
| 0 | 0 | 0 | 0 |
| 0 | 0 | 1 | 1 |
| 0 | 1 | 0 | 1 |
| 0 | 1 | 1 | 2 |
| 1 | 0 | 0 | −2 |
| 1 | 0 | 1 | −1 |
| 1 | 1 | 0 | −1 |
| 1 | 1 | 1 | 0 |

I claim:

1. A multiply/divide unit for a high-performance digital computer for processing data X, Y and Z which comprises a decoder for receiving respective corresponding bits of the data X,Y and for outputting selecting signals for given multiples of the data Z without adding X and Y; and means for obtaining values corresponding to products of the data Z and said given multiples selected by said selecting signals and adding said values, wherein said decoder includes a plurality of logical means provided for each group of the $2j-1^{th}$ bit and the $2j^{th}$ bit of the data X and Y in which $j=1,2,3,4, \ldots$; the $j^{th}$ one of said logical means including an adder for adding the corresponding $2j-1^{th}$ bit and $2j^{th}$ bit groups of the data X and Y to output an uppermost bit $a_{2j}$, an intermediate bit $b_{2j}$ and a lowermost bit $d_{2j}$ and a decoding means for carrying out an operation of $[(d_{2j-2} \oplus a_{2j}) \times 2 + b_{2j} + (d_{2j} \vee a_{2j+2})]$ based on the outputs of said adder and outputs $a_{2j+2}$ and $d_{2j-2}$ from adders of the $j+1^{th}$ logical means and $j-1^{th}$ logical means to thereby generate the selecting signals for the given multiples relative to data Z.

2. A multiply/divide unit as claimed in claim 1, wherein the outputs of said decoding means are $+2$, $-2$, $+1$, $-1$, or 0.

3. A multiply/divide unit for carrying out a division operation comprising a multiplier device receiving, as an input, a multiplicand $1 - D \times D_t^{-1}$ where D is a divisor and $D_t^{-1}$ is an approximation of the reciprocal of the divisor D and outputting a carry and sum; and a decoder including means, in a first cycle, for receiving given upper bits of a value $N \times D_t^{-1}$ (where N is a dividend), and in succeeding cycles, for receiving given upper bits of said carry and sum outputted from said multiplier device and supplying the outputs thereof to said multiplier device.

4. A multiply/divide unit as claimed in claim 3, wherein said multiplier device is formed of a carry save adder device of a tree structure.

5. A multiply/divide unit as claimed in claims 3 or 4, wherein said decoder includes a plurality of logical means provided for each group of the $2j-1^{th}$ bit and $2j^{th}$ bit of two inputs (where $j=1,2,3,\ldots$); the $j^{th}$ one of said logical means including an adder for adding the corresponding $2j-1^{th}$ bit and $2j^{th}$ bit groups of the two inputs to output an uppermost bit $a_{2j}$, an intermediate bit $b_{2j}$ and a lowermost bit $d_{2j}$ and a decoding means for carrying out an operation of $[(d_{2j-2} \oplus a_{2j}) \times 2 + b_{2j} + (d_{2j} \vee a_{2j+2})]$ based on the outputs of said adder and outputs $a_{2j+2}$ and $d_{2j-2}$ from adders of the $j+1^{th}$ logical means and $j-1^{th}$ logical means to thereby output the result of the operation to said multiplier device.

6. A multiply/divide unit as claimed in claim 5, wherein the outputs of said decoding means are $+2$, $+1$, $-1$, $-2$, or 0.

7. A multiply/divide unit as claimed in claim 5, further comprising another carry save adder tree where one input thereof is the output of said another carry save adder tree and another input is the multiple of the divisor selected by the output of said decoder.

* * * * *